(12) United States Patent
Li et al.

(10) Patent No.: US 11,824,571 B1
(45) Date of Patent: Nov. 21, 2023

(54) SENSING SIGNAL RECEIVING SYSTEM AND METHOD

(71) Applicants: SINOMACH SENSING TECHNOLOGY CO., LTD., Liaoning (CN); SHENYANG ACADEMY OF INSTRUMENTATION SCIENCE CO., LTD., Liaoning (CN)

(72) Inventors: Zhichao Li, Liaoning (CN); Chunguang Zhang, Liaoning (CN); Guangheng Liu, Liaoning (CN); Jiarui Liu, Liaoning (CN); Shangqing Li, Liaoning (CN); Yingjiao Gong, Liaoning (CN); Lei An, Liaoning (CN); Shuai Chu, Liaoning (CN); Junfeng Zhang, Liaoning (CN); Jiahui Liu, Liaoning (CN); Yubing Yang, Liaoning (CN); Zhitao Sun, Liaoning (CN); Zhongwei Wang, Liaoning (CN)

(73) Assignees: SINOMACH SENSING TECHNOLOGY CO., LTD., Liaoning (CN); SHENYANG ACADEMY OF INSTRUMENTATION SCIENCE CO., LTD., Liaoning (CN)

( * ) Notice: Subject to any disclaimer, the term of this patent is extended or adjusted under 35 U.S.C. 154(b) by 0 days.

(21) Appl. No.: 18/022,356

(22) PCT Filed: Sep. 8, 2022

(86) PCT No.: PCT/CN2022/117815
§ 371 (c)(1),
(2) Date: Feb. 21, 2023

(30) Foreign Application Priority Data

Jul. 7, 2022 (CN) .......................... 202210804013.9

(51) Int. Cl.
*H04B 1/12* (2006.01)

(52) U.S. Cl.
CPC ...................................... *H04B 1/12* (2013.01)

(58) Field of Classification Search
CPC ........................................................ H04B 1/12
See application file for complete search history.

(56) References Cited

U.S. PATENT DOCUMENTS

2005/0147192 A1  7/2005  Yamamoto et al.
2017/0038263 A1* 2/2017  Fury ......................... G01K 3/10
(Continued)

FOREIGN PATENT DOCUMENTS

CN     102594468 A    7/2012
CN     202617097 U    12/2012
(Continued)

*Primary Examiner* — Junpeng Chen
(74) *Attorney, Agent, or Firm* — Bret E. Field; Bozicevic, Field & Francis LLP

(57) ABSTRACT

The present application discloses a sensing signal receiving system and method. The system includes an interface module configured to receive a sensing signal, a narrowband frequency-selective module configured to determine a frequency-selective signal in the sensing signal according to a preset receive frequency, a high amplification module configured to amplify the received frequency-selective signal to obtain an amplified signal, and an in-phase comparison module configured to convert the amplified signal into a TTL standard signal. A frequency of the frequency-selective signal is the preset receive frequency or is a narrowband section including the preset receive frequency. The narrowband frequency-selective module is further configured to output the frequency-selective signal to the high amplification module. According to the technical solutions of the present application, a missing report or a false report of an available signal may be effectively avoided, thereby ensuring reliable transmission of the sensing signal.

8 Claims, 2 Drawing Sheets

(56) References Cited

U.S. PATENT DOCUMENTS

2017/0230921 A1    8/2017  Kawakami et al.
2019/0386758 A1   12/2019  Simons et al.
2020/0400853 A1*  12/2020  Zheng .................... G01R 33/04

FOREIGN PATENT DOCUMENTS

| CN | 103197209 A  | 7/2013  |
| CN | 208399531 U  | 1/2019  |
| CN | 110346091 A  | 10/2019 |
| CN | 115001519 A  | 9/2022  |
| JP | 2015-220631 A | 12/2015 |

* cited by examiner

SENSING SIGNAL RECEIVING SYSTEM AND METHOD

FIELD OF THE INVENTION

The present disclosure relates to the technical field of sensing signal processing, and in particular, to a sensing signal receiving system and method.

BACKGROUND OF THE INVENTION

Today, sensors have been widely applied in civil and industrial applications. As a detection device, the sensor may receive measured information, and convert the measured information into an electrical signal or any one of other required forms of information for output according to a set rule. Common electrical signals are in a form of an analog value or a digital value. In application, the sensor is generally connected to a dedicated interface of a controller, such as an analog interface or a digital interface. For the controller, a number of the dedicated interfaces is limited. Although the controller has a relatively large number of common 110 interfaces, a signal output by the sensor cannot be directly read due to lack of drive.

In addition, when the sensor is applied to a pipeline and a submarine environment, the signal output by the sensor may be attenuated or interfered, so that an available signal does not meet a standard digital signal specification or is submerged in noise. If the sensor is directly connected to the controller, reading may be distorted. At present, a feasible method for receiving a sensing signal is to directly amplify a passband of the sensing signal through a receiver, which is equivalent to adding an amplifier on a sensor output side, so that distortion of the sensing signal may be reduced in an ideal environment.

However, according to the foregoing method, the sensing signal is estimated and observed merely based on a time domain rather than a frequency domain. As a result, a missing report or a false report of the available signal is likely to be caused, and distortion of the sensing signal is still caused. In addition, according to the foregoing method, narrowband noise rather than white noise is used during receiving of the sensing signal. As a result, transmission reliability of the sensing signal cannot be ensured.

SUMMARY OF THE INVENTION

The present disclosure provides a sensing signal receiving system and method, to resolve the following problem: due to relatively loud noise of various frequency bands outside, a missing report or a false report of an available signal is caused in a communication process of a sensing signal by submergence of the available signal into the noise, and thus distortion of the sensing signal is caused. According to the present disclosure, problems about noise in various frequency band ranges of a received sensing signal are resolved by performing signal frequency-selective amplification on and converting a square wave signal, a sine wave signal, or a superimposed signal to generate a TTL standard signal, thereby ensuring reliable transmission of the sensing signal.

The present invention is implemented through the following technical solutions.

According to a first aspect, the present application provides a sensing signal receiving system, where the system includes an interface module, a narrowband frequency-selective module, a high amplification module, and an in-phase comparison module;

the interface module is configured to receive a sensing signal;

the narrowband frequency-selective module is configured to determine a frequency-selective signal in the sensing signal according to a preset receive frequency, where a frequency of the frequency-selective signal is the preset receive frequency or is a narrowband section including the preset receive frequency, and the narrowband frequency-selective module is further configured to output the frequency-selective signal to the high amplification module;

the high amplification module is configured to amplify the received frequency-selective signal to obtain an amplified signal; and the in-phase comparison module is configured to convert the amplified signal into a standard signal.

Further, when the sensing signal contains a noise signal whose frequency is in the narrowband section, two center frequency points are selected from the narrowband section, one of the center frequency points is used for the narrowband frequency-selective module to tune the noise signal to the center frequency point in the narrowband frequency-selective module, and the other of the center frequency points is used for the high amplification module.

Further, the narrowband frequency-selective module comprises a first preset number of gain stages of first band-pass filter circuits that are cascaded, wherein the first band-pass filter circuit includes a first high-pass filter circuit comprising two resistors and a capacitor that are electrically connected and a first high-stop filter circuit comprising a resistor and a capacitor that are electrically connected.

Further, the high amplification module comprises a second preset number of gain stages of second band-pass filter circuits that are cascaded, wherein the second band-pass filter circuit includes a second low-pass filter circuit comprising a resistor and a capacitor that are electrically connected and a second high-pass filter circuit comprising a resistor and a capacitor that are electrically connected.

Further, the first preset number of gain stages is 1, and the second preset number of gain stages is 6.

Further, the first preset number of gain stages is 3, and the second preset number of gain stages is 9.

Further, the in-phase comparison module converts the amplified signal into the standard signal by an upper hysteresis threshold and a lower hysteresis threshold.

Further, a unit of a signal amplitude of the frequency-selective signal is millivolt or microvolt.

According to a second aspect, the present application provides a sensing signal receiving method, where the method includes:

acquiring a sensing signal;

selecting a frequency band according to the sensing signal to obtain a frequency-selective signal;

amplifying the frequency-selective signal to obtain an amplified signal; and converting the amplified signal into a standard signal.

Further, the frequency band includes a preset receive frequency or a narrowband section of the preset receive frequency, and the preset receive frequency is a center frequency of the frequency-selective signal.

The present application provides a sensing signal receiving system and method, including the interface module, the narrowband frequency-selective module, the high amplification module, and the in-phase comparison module. The interface module is configured to receive the sensing signal. The narrowband frequency-selective module is configured to determine the frequency-selective signal in the sensing signal according to the preset receive frequency. The frequency of the frequency-selective signal is the preset receive frequency or is the narrowband section including the preset receive frequency. The narrowband frequency-selective module is further configured to output the frequency-selective signal to the high amplification module. The high amplification module is configured to amplify the received frequency-selective signal to obtain the amplified signal. The in-phase comparison module is configured to convert the amplified signal into the standard signal. According to the technical solutions of the present application, the missing report or the false report of the available signal may be effectively avoided, thereby ensuring the reliable transmission of the sensing signal.

BRIEF DESCRIPTION OF THE DRAWINGS

In order to describe the technical solutions of the present application to be more clear, the accompanying drawings to which the embodiments refer are briefly described below. Obviously, from these accompanying drawings, other accompanying drawings may also be derivable to persons of ordinary skills in the art without an effective effort.

DETAILED DESCRIPTION OF THE EMBODIMENTS

Figure 1:
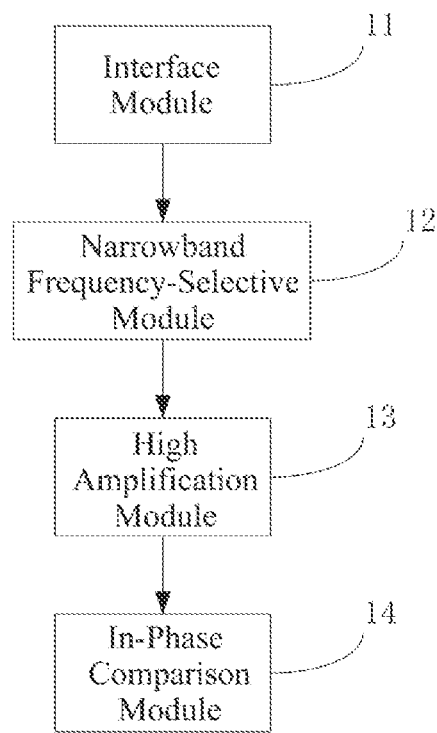
FIG. 1 is a schematic diagram of a sensing signal receiving system according to an embodiment of the present application.

The technical solutions in the embodiments of the present disclosure are described below to be clear and complete in conjunction with the accompanying drawings to which the embodiments of the present disclosure refer. Obviously, the described embodiments are merely some, not all, of embodiments of the present invention. According to the embodiments in the present disclosure, all other embodiments derived by one of ordinary skills in the art without an effective effort fall within the protection scope of the present disclosure.

In order to resolve a problem that, due to relatively loud noise of various frequency bands outside, a missing report or a false report of an available signal is caused in a communication process of a sensing signal by submergence of the available signal into the noise, according to the present disclosure, problems about noise of a received signal within various frequency band ranges may be resolved by performing signal frequency-selective amplification on and converting a square wave sensing signal, a sine wave sensing signal, or a superimposed sensing signal to generate a TTL standard signal, thereby ensuring reliable transmission of the sensing signal.

To facilitate understanding of the technical solutions of the embodiments of the present application, prior to describing the specific implementations of the embodiments of the present application, some technical terms in the technical field of the embodiments of the present application are first briefly explained.

Attenuation: While a signal propagates in a transmission medium, a part of energy may be converted into heat energy or may be absorbed by the transmission medium, resulting in continuous weakening of strength of the signal, so that the strength of the signal may become reduced while the signal prorogates in a cable or in the air. This phenomenon is referred to as attenuation.

Signal-to-Noise Ratio: indicating a ratio of a signal to noise in an electronic device or in an electronic system, where the signal herein refers to an electronic signal, from outside of the device, to be processed through the electronic device; and the noise refers to an irregular additional signal (or information), not exist in an original signal, generated through the electronic device, without changing with the original signal.

TTL level: According to criterion of a TTL level signal, +5 V is equivalent to logic "1" and 0 V is equivalent to logic "0" (when data is represented through binary). Such data communication and level criterion mode is referred to as a transistor-transistor logic (TTL) signal system. This is a standard technology for communication between various parts within a device controlled by a computer processor.

Frequency-selective amplification: An amplification unit has a prominent amplification effect on signals of a certain frequency band or a single frequency, and has a strong inhibition effect on signals of other frequencies. Resonant amplifiers, active band-pass filters and the like all belong to such a category.

Gain: Gain generally means an amplification factor. In electronics, gain typically indicates a ratio of signal output to signal input of a system.

Frequency band: In the field of digital control, frequency band refers to a frequency range of a frequency band in a signal, with a unit of Hz.

Band-pass filtering: Signals of a particular frequency band are allowed to pass through, while signals of other frequency bands are shielded.

Frequency domain: indicating a coordinate system used to describe frequency characteristics of a signal. In electronics, control systems engineering and statistics, the frequency domain shows an amount of signals in each given frequency band within a frequency range.

Time domain: Time domain describes a mathematical function or a relation of a physical signal to time. For example, a time domain waveform of a signal may express a change of the signal with time.

Referring to FIG. 1, FIG. 1 is a schematic diagram of a sensing signal receiving system according to an embodiment of the present application.

It may be learned from FIG. 1 that a sensing signal receiving system provided according to an embodiment of the present application is connected between a receiving device and a controller I/O interface by using a 5 Pin interface according to the present disclosure. The receiving device may receive a sensing signal with noise within a certain range, and then transmit the sensing signal to the sensing signal receiving system. The sensing signal processed and output by the sensing signal receiving system may be implemented as a noise-removed sensing signal, which may be read directly by the controller I/O interface. Subsequently, a secondary development may be rapidly performed on the sensing signal at a communication protocol level.

Specifically, the system according to the present disclosure includes an interface module 11, a narrowband frequency-selective module 12, a high amplification module 13, and an in-phase comparison module 14.

The interface module 11 is configured to receive a sensing signal with noise received by the receiving device from the outside. A signal type may be a standard sine wave, a square wave, or a superposition of the standard sine wave and the square wave. In consideration of onsite signal interference, working condition noise, signal interference between devices, and the like, even if the sensing signal may be attenuated highly, the attenuated sensing signal still contains noise with a much larger amplitude than the available signal. In order to make the available signal in the sensing signal be output to the controller I/O interface, the present application is designed to be reliable in reliable designs in time domain and frequency domain.

Figure 2:
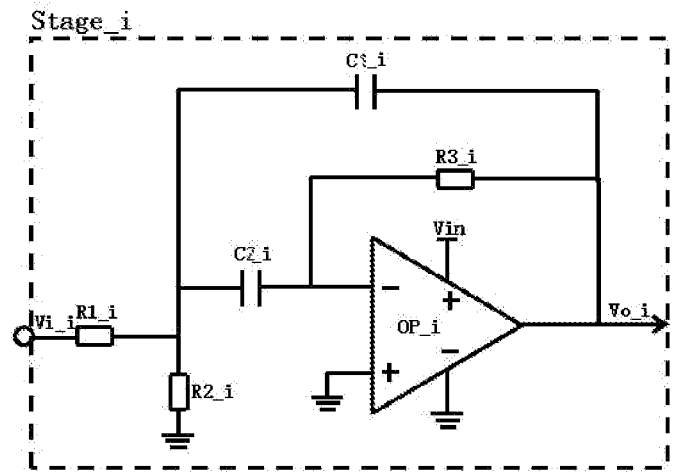
FIG. 2 is a schematic circuit diagram of a narrowband frequency-selective module according to an embodiment of the present application.

FIG. 2 shows a schematic circuit diagram of a narrowband frequency-selective module 12 according to an embodiment of the present application. The narrowband frequency-selective module 12 comprises a first preset number of gain stages of first band-pass filter circuits that are cascaded. The first band-pass filter circuit includes a first high-pass filter circuit and a first high-stop filter circuit. $Vi\_i$ represents an input voltage, $Vo\_i$ represents an output voltage, $OP\_i$ represents an operational amplifier, $R3\_1$ represents a resistor, and Vin represents a power supply voltage. Specifically, after $Vi\_i$ is divided by $R1\_i$ and $R2\_i$, high-pass filtering is formed through $C2\_i$, wherein a frequency band (including a DC component) below a frequency-selective point is filtered out. High-stop filtering is formed by $Vo\_i$ passing through $C1\_i$ and a $R2\_i$, wherein a frequency band above the frequency-selective point is filtered out. So far, a band-pass filtering process is completed.

Specifically, the narrowband frequency-selective module 12 is further configured to determine a frequency-selective signal in the sensing signal according to a preset receive frequency. The preset receive frequency is a frequency determined in advance according to an actual onsite condition. It is assumed that the preset receive frequency is 25 Hz. A frequency of the frequency-selective signal is the preset receive frequency or is a narrowband section including the preset receive frequency. When the sensing signal contains a noise signal whose frequency is in the narrowband section, two center frequency points are selected from the narrowband section. One of the center frequency points is used for the narrowband frequency-selective module 12 to tune the noise signal to the center frequency point in the narrowband frequency-selective module 12, and the other of the center frequency points is used for the high amplification module 13. When a frequency of the noise signal is close to that of the sensing signal, the noise signal is tailored to the center frequency point for the narrowband frequency-selective module 12, i.e., the preset receive frequency, that is, the noise signal is tuned to the center frequency point in the narrowband frequency-selective module 12. In other words, the preset receive frequency is equivalent to the center frequency point in the narrowband frequency-selective module 12.

For example, the preset receive frequency is 25 Hz, and the frequency-selective signal may be set to have a narrowband section of 23 Hz to 29 Hz. However, a frequency of the center frequency point in the narrowband frequency-selective module 12 may be selected as a point close to 25 Hz, such as 23.5 Hz. When there is no noise, because a frequency range of the narrowband section covers 25 Hz, the sensing signal may be received by the narrowband frequency-selective module 12 and next may be amplified in the high amplification module 13. In other words, the center frequency point in the high amplification module 13 is 25 Hz, that is, 25 Hz is amplified. When there is only white noise without a signal, the white noise is guided to the center frequency point, i.e., a frequency of 23.5 Hz, in the narrowband frequency-selective module 12. Subsequently, the controller I/O interface may identify the interfering white noise. When the signal is superimposed with the white noise, that is, when there is both 25 Hz and white noise, an output frequency at this time may be different according to a ratio of noise to a signal amplitude. Through integrating the preset receive frequency of 25 Hz with the white noise of 23.5 Hz guided to the center frequency point in the narrowband frequency-selective module 12, a finally obtained frequency is between 23.5 Hz and 25 Hz.

Figure 3:
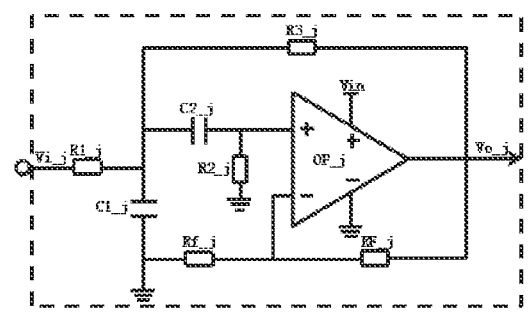
FIG. 3 is a schematic circuit diagram of a high amplification module according to an embodiment of the present application.

After the frequency-selective signal is attenuated, some noise signals close to the frequency of the frequency-selective signal may still remain, for example, noise signals of 24.5 Hz or 25.3 Hz that are close to the frequency of the frequency-selective signal. The frequency-selective signal is output to the high amplification module 13 through the narrowband frequency-selective module 12. FIG. 3 shows a schematic circuit diagram of a high amplification module 13 according to an embodiment of the present application. The high amplification module 13 comprises a second preset number of gain stages of second band-pass filter circuits that are cascaded. The second band-pass filter circuit includes a second low-pass filter circuit and a second high-pass filter circuit. $Vi\_j$ represents an input voltage, $Vo\_J$ represents an output voltage, $OP\_J$ represents an operational amplifier, $RF\_J$ and $Rf\_J$ represent two feedback resistors that are connected in series, and Vin represents a power supply voltage. The second low-pass filter circuit is formed by a resistor $R1\_J$ and a capacitor $C1\_J$, and the second high-pass filter circuit is formed by a resistor $R2\_J$ and a capacitor $C2\_J$. Positive voltage feedback is introduced through a resistor $R3\_J$. Because the frequency-selective signal typically has an amplitude of only a few millivolts or even a few microvolts, negative feedback is introduced through $RF\_j$ and $Rf\_j$, so that the signal may be amplified proportionally.

Specifically, the high amplification module 13 maximizes a gain in a relatively wide frequency band range in a cascading manner. For example, because the high amplification module 13 performs a amplification in a range of 25 Hz plus or minus 5 Hz for amplification, the high amplification module 13 may usually make a single stage have a gain by 10 time, and thus it is convenient to observe the amplified signal in a time domain level. The second preset number of gain stages depends on an amplitude of the sensing signal, an amplitude of ambient noise, and the first preset number of gain stages. The first preset number of gain stages and the second preset number of gain stages need to be adjusted to match with each other. In an ideal environment, it is preferable for the present application to adopt that the first preset number of gain stages is 1 and the second preset number of gain stages is 6 for achieving $10^6$-time amplification of the frequency-selective signal. Another preferable manner of this embodiment of the present application is that the first preset number of gain stages is 3 and the second preset number of gain stages is 9, for achieving $10^9$-time amplification of the frequency-selective signal. The frequency-selective signal passes through the high amplification module 13 to ensure that the input sensing signal in the millivolt range or in the microvolt range may be output to a reference value range of the in-phase comparison module 14 in a saturate way.

Figure 4:
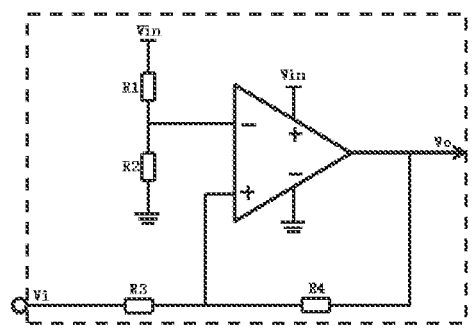
FIG. 4 is a schematic circuit diagram of an in-phase comparison module according to an embodiment of the present application.

The in-phase comparison module 14 is configured to convert the amplified signal into a standard signal. FIG. 4 shows a schematic circuit diagram of an in-phase comparison module 14 according to an embodiment of the present application. In FIG. 4, Vin represents a power supply voltage, Vi represents an input voltage, Vo represents an output voltage, and R1, R2, R3, and R4 respectively represent resistors. To ensure that an output signal of the amplified signal conforms to the TTL standard, that is, +5V represents logic "1" and 0V represents logic "0", the in-phase comparison module 14 converts the amplified signal to a standard signal. An upper hysteresis threshold and a lower hysteresis threshold are set in the in-phase comparison module 14. The upper hysteresis threshold and the lower hysteresis threshold are taken as two reference points, so that the amplified signal needs to rise to voltage $V_H$ or fall or fall to voltage $V_L$ when an output is switched to high level or low level. $V_H$ and $V_L$ may be derived according to an existing calculation formula. A specific calculation process is not described in detail. When the amplified signal is higher than $V_H$, it is considered that the signal reaches logic "1"; and when the amplified signal is lower than $V_L$, it is considered that the signal returns to logic "0". Compared with a single reference point, the setting of the upper hysteresis threshold and the lower hysteresis threshold may eliminate a poor output conversion caused by noise.

The present disclosure may be applied to communication scenarios inside and outside a pipeline. For example, the receiving systems according to the present disclosure are disposed at various positions on an outer side of a long transmission pipeline. The receiving system according to the present disclosure is connected between the receiving device and the controller I/O interface. By disposing a data collection device in a casing scraper of the pipeline, the data collection device serving as the receiving device collects and then transmits a sensing signal in the casing scraper to the receiving system according to the present disclosure.

The receiving system includes the interface module 11, the narrowband frequency-selective module 12, the high amplification module 13, and the in-phase comparison module 14. The interface module 11 is provided with an interface unit. The interface unit receives and transmits the sensing signal collected by the receiving device to a frequency selector in the narrowband frequency-selective module 12. The frequency selector performs frequency selection on the sensing signal by the center frequency point, to select a frequency-selective signal of the available signal. Subsequently, the frequency-selective signal is transmitted to an amplifier in the high amplification module 13. The amplifier implements a narrowband high-gain amplification function for the frequency-selective signal to obtain the amplified signal. Subsequently, the amplified signal is transmitted to a comparator in the in-phase comparison module 14. The comparator converts the amplified signal to the standard signal through a hysteresis function. The output standard signal may be used directly by the controller I/O interface, without other processing.

According to the present disclosure, verification is performed through Fourier analysis in an entire frequency domain, and a signal-to-noise ratio of the output sensing signal facilitates processing of the controller I/O interface.

Figure 5:
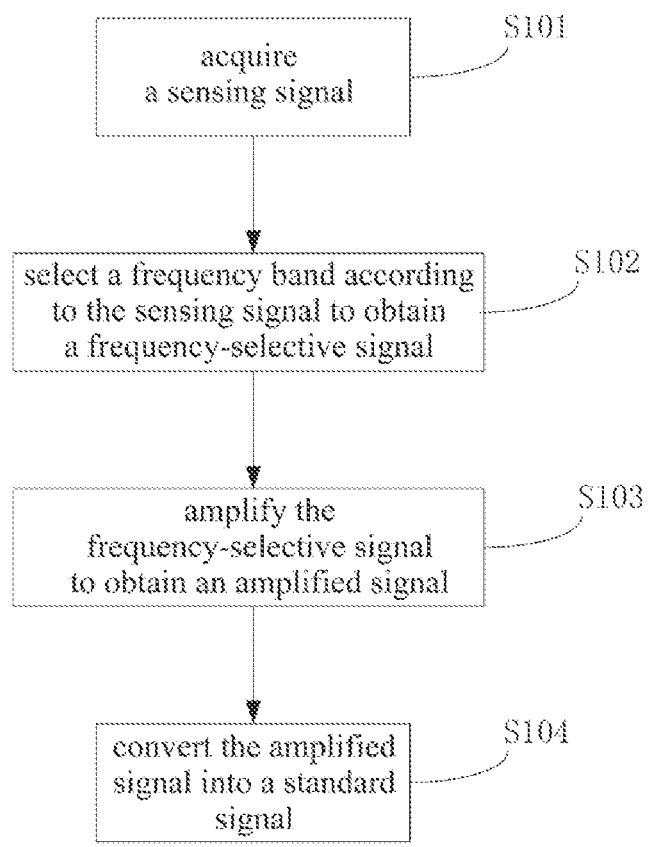
FIG. 5 is a flowchart of a sensing signal receiving method according to an embodiment of the present application.

As shown in FIG. 5, an embodiment of the present application further provides a sensing signal receiving method. The method includes the following steps.

S101: Acquire a sensing signal.

A sensing signal received by a receiving device from the outside is acquired. A signal type may be a standard sine wave, a square wave, or a superposition of the standard sine wave and the square wave.

S102: Select a frequency band according to the sensing signal to obtain a frequency-selective signal.

The frequency-selective signal is selected from the sensing signal according to a preset receive frequency. The frequency of the frequency-selective signal is the preset receive frequency or is a narrowband section including the preset receive frequency. When the sensing signal contains a noise signal whose frequency is in the narrowband section, two center frequency points are selected from the narrowband section. One of the center frequency points is used for a narrowband frequency-selective module 12 to tune the noise signal to the center frequency point in the narrowband frequency-selective module 12, and the other of the center frequency points is used for a high amplification module 13.

S103: Amplify the frequency-selective signal to obtain an amplified signal.

A pass-band bandwidth is set to a limited number of non-adjacent narrow bandwidths by cascading, so as to meet requirements on writing of a complex communication protocol, and achieve maximization of a gain in a relatively wide frequency band range. Gain amplification is performed on the frequency-selective signal to obtain the amplified signal.

S104: Convert the amplified signal into a standard signal.

The amplified signal is converted into the standard signal through an upper hysteresis threshold and a lower hysteresis threshold that are set, so as to eliminate a poor output conversion caused by noise.

The present application provides a sensing signal receiving system and method, including the interface module 11, the narrowband frequency-selective module 12, the high amplification module 13, and the in-phase comparison module 14. The interface module 11 is configured to receive the sensing signal. The narrowband frequency-selective module 12 is configured to determine the frequency-selective signal in the sensing signal according to the preset receive frequency. The frequency of the frequency-selective signal is the preset receive frequency or is the narrowband section including the preset receive frequency. The narrowband frequency-selective module 12 is further configured to output the frequency-selective signal to the high amplification module 13. The high amplification module 13 is configured to amplify the received frequency-selective signal to obtain the amplified signal. The in-phase comparison module 14 is configured to convert the amplified signal into the standard signal. According to the technical solutions of the present application, the missing report or the false report of the available signal may be effectively avoided, thereby ensuring the reliable transmission of the sensing signal.

A person skilled in the art would easily conceive of other implementation solutions of the present disclosure in view of the specification and practicing the disclosure disclosed herein. The present application is intended to cover any variation, use, or adaptive change of the present disclosure. These variations, uses, or adaptive changes follow the general principle of the present disclosure and include the common general knowledge or common technical means in this technical filed that is not disclosed in the present disclosure. The specification and the embodiments are merely considered to be exemplary, and the actual scope and spirit of the present disclosure are indicated in the following claims.

It should be understood that the present disclosure is not limited to the exact structure that is described above and is shown in the figures, and various modifications and changes may be made thereto, without departing from the scope thereof. The scope of the present disclosure is merely limited by the appended claims.

What is claimed is:

1. A sensing signal receiving system, comprising an interface module,
   a narrowband frequency-selective module, a high amplification module, and an in-phase comparison module;
   the interface module is configured to receive a sensing signal;
   the narrowband frequency-selective module is configured to determine a frequency-selective signal in the sensing signal according to a preset receive frequency, wherein a frequency of the frequency-selective signal is the preset receive frequency or is a narrowband section including the preset receive frequency, and the narrowband frequency-selective module is further configured to output the frequency-selective signal to the high amplification module;
   the high amplification module is configured to amplify the received frequency-selective signal to obtain an amplified signal; and
   the in-phase comparison module is configured to convert the amplified signal into a standard signal,
   wherein the narrowband frequency-selective module comprises a first preset number of gain stages of first band-pass filter circuits that are cascaded, wherein the first band-pass filter circuit comprises a first high-pass filter circuit comprising a resistor and a capacitor that are electrically connected, and a first high-stop filter circuit comprising a resistor and a capacitor that are electrically connected, and
   wherein the high amplification module comprises a second preset number of gain stages of second band-pass filter circuits that are cascaded, wherein the second band-pass filter circuit comprises a second low-pass filter circuit comprising a resistor and a capacitor that are electrically connected and a second high-pass filter circuit comprising a resistor and a capacitor that are electrically connected.

2. The sensing signal receiving system according to claim 1, wherein two center frequency points are selected from the narrowband section when the sensing signal contains a noise signal whose frequency is in the narrowband section, wherein one of the center frequency points is used for the narrowband frequency-selective module to tune the noise signal to the center frequency point in the narrowband frequency-selective module, and the other of the center frequency points is used for the high amplification module.

3. The sensing signal receiving system according to claim 1, wherein the first preset number of gain stages is 1, and the second preset number of gain stages is 6.

4. The sensing signal receiving system according to claim 1, wherein the first preset number of gain stages is 3, and the second preset number of gain stages is 9.

5. The sensing signal receiving system according to claim 1, wherein the in-phase comparison module converts the amplified signal into the standard signal by an upper hysteresis threshold and a lower hysteresis threshold.

6. The sensing signal receiving system according to claim 1, wherein a unit of a signal amplitude of the frequency-selective signal is millivolt or microvolt.

7. A sensing signal receiving method for the sensing signal receiving system according to claim 1, comprising:
   acquiring a sensing signal;
   selecting a frequency band according to the sensing signal to obtain a frequency-selective signal;
   amplifying the frequency-selective signal to obtain an amplified signal; and
   converting the amplified signal into a standard signal.

8. The sensing signal receiving method according to claim 7, wherein the frequency band comprises a preset receive frequency or a narrowband section of the preset receive frequency, and the preset receive frequency is a center frequency of the frequency-selective signal.

* * * * *